Dec. 30, 1952     V. C. KENNEDY     2,623,493
WEIGHING SCALE

Filed Dec. 29, 1948     3 Sheets-Sheet 1

Inventor
Verne C. Kennedy,
By Dawson, Orms, Bethany Spangenberg,
Attorneys.

Dec. 30, 1952     V. C. KENNEDY     2,623,493
WEIGHING SCALE

Filed Dec. 29, 1948     3 Sheets-Sheet 3

Inventor.
Verne C. Kennedy,
By Dawson, Ome, Brittsy Hugenberg,
Attorneys.

Patented Dec. 30, 1952

2,623,493

UNITED STATES PATENT OFFICE 2,623,493

WEIGHING SCALE

Verne C. Kennedy, Evanston, Ill., assignor to Streeter-Amet Company, Chicago, Ill., a corporation of Illinois Application December 29, 1948, Serial No. 68,008

12 Claims. (Cl. 116—129)

This invention relates to weighing scales and more particularly to a scale for weighing and automatically indicating the net weight of one or more loads.

In weighing materials such as train or truck loads, it has been the usual practice to indicate the gross and tare weights of the load and to subtract the tare weight from the gross weight to obtain the net weight of the load. The total accumulated weight of a series of loads has usually been obtained by adding the individual net weights of the several loads.

It is one of the objects of the present invention to provide a weighing scale in which an indication of the net weight of a load is obtained directly.

Another object is to provide a weighing scale in which the accumulated total of a series of net weights is directly obtained. Preferably the scale can indicate both the sub-total of a series of loads such as the total net load of a train of cars or trucks weighed one or more at a time and the accumulated total of a series of sub-totals such as the total net weight of several train loads.

Still another object is to provide an indicating mechanism for a scale which will indicate separate loads or sub-totals of separate series of loads and will simultaneously indicate the accumulated total of a number of separate loads or of a number of sub-totals.

A further object is to provide a weighing scale which is extremely simple in construction, which is accurate and reliable in operation and which can be easily used to obtain indications of the net weights of loads or series of loads with minimum possibility of error.

The above and other objects and advantages of the invention will be more readily apparent when read in connection with the accompanying drawings, in which—

Figure 1:
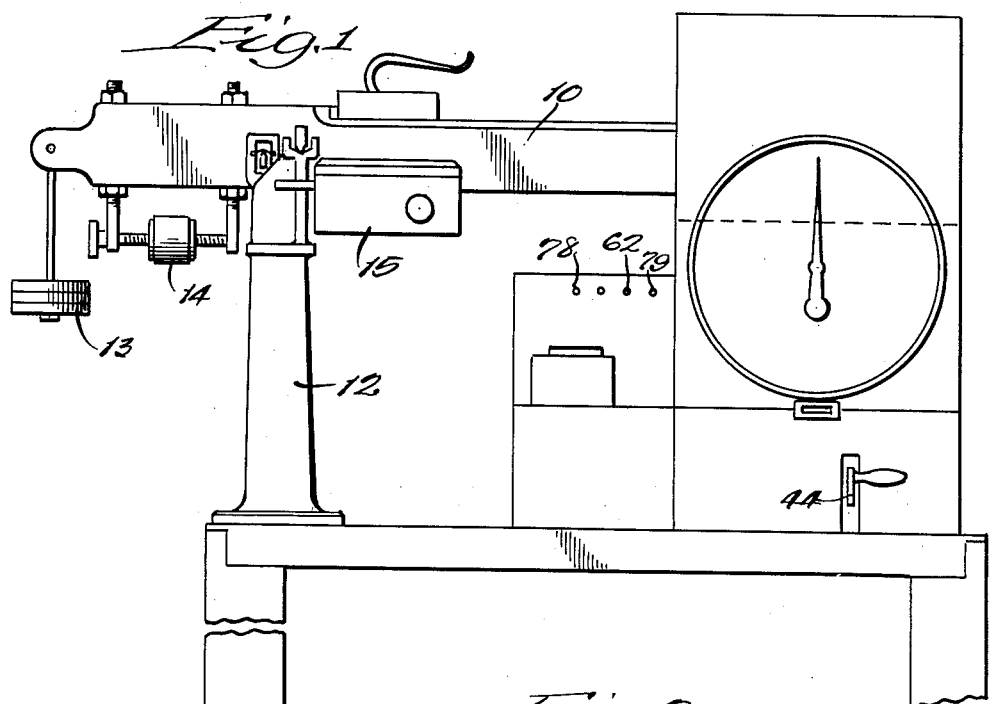
Figure 1 is a front elevation of a weighing scale embodying the invention.
Figure 2:
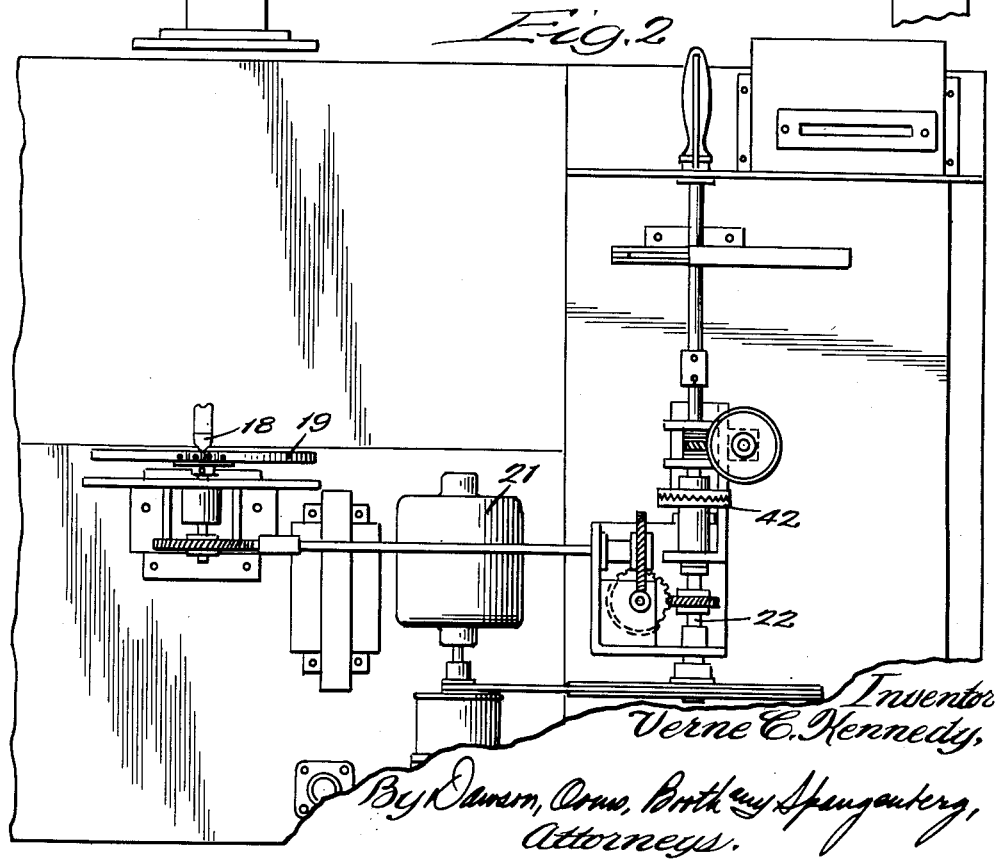
Figure 2 is a plan view with parts removed illustrating the driving mechanism.
Figure 4:
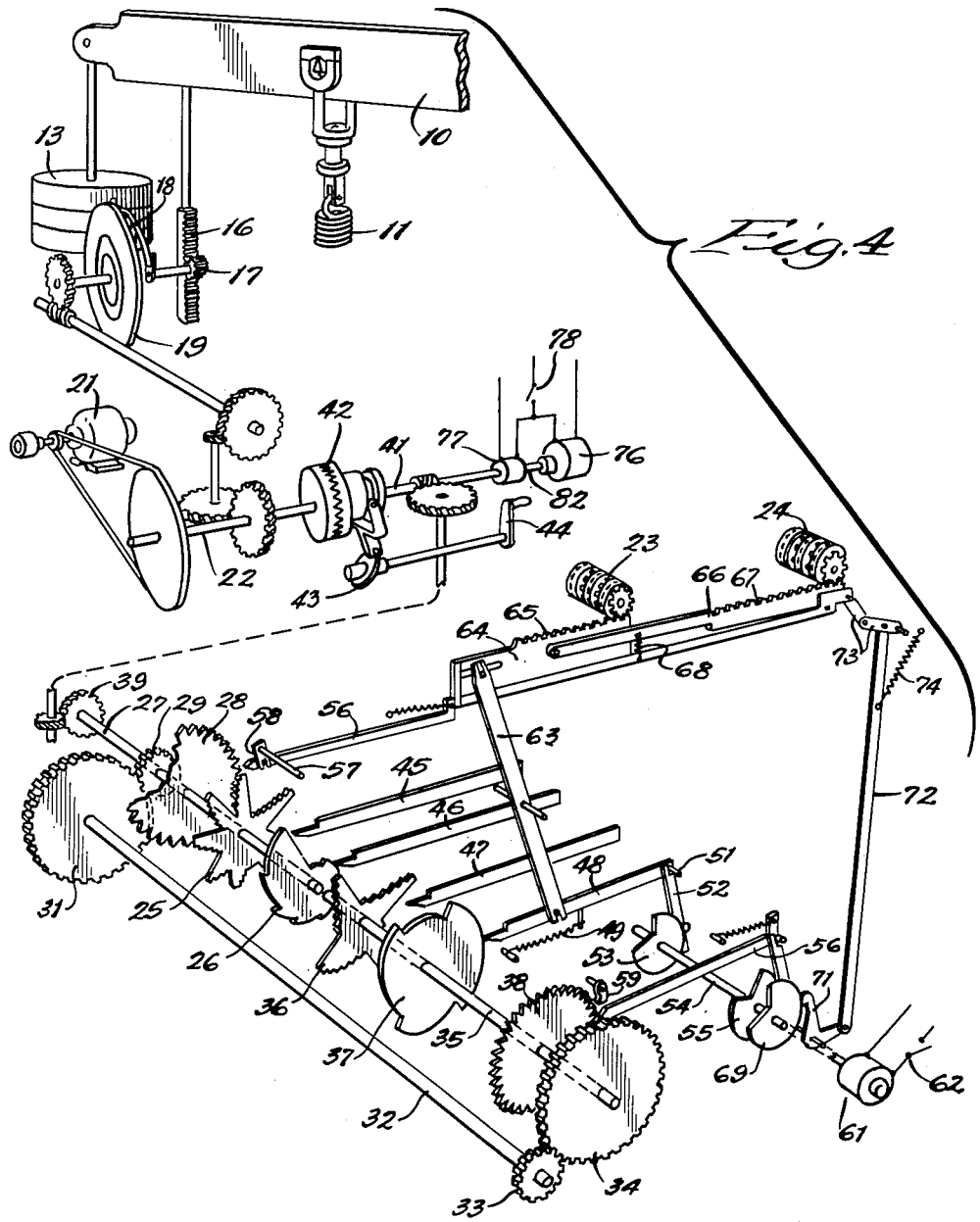
Figure 4 is a diagrammatic perspective view illustrating the entire scale of the invention.

The scale, as illustrated, is adapted to be used with any desired type of platform or support which receives a load to be weighed such as one or more railroad cars, trucks or the like. This platform or receiving mechanism, not shown, may be connected through a conventional scale linkage to a pivoted balance beam 10 forming a part of the weighing mechanism of the invention. The balance beam, as best seen in Figure 4, is urged in one direction by a spring 11 so that the beam will occupy a position which is dependent upon the weight on the platform or support. In other words the beam is not of the type which is returned to a neutral balance position by the shifting of balance weights or the like but is of the type in which the position of the beam about its pivot is proportional to the load being weighed. As shown in Figure 1, the beam is pivotally supported on an upright 12 and may carry the several counter-balance weights 13, 14 and 15 by means of which the beam may be initially balanced and calibrated.

The beam is connected at a point remote from its pivot with a rack 16 meshing with a pinion 17 which carries a wiper contact 18 movable over a split contact 19. The contact 19 is in the form of a disc having spaced contact rings thereon to provide a neutral point between the rings on which the wiper 18 may rest. The contact rings are connected to a reversible motor 21 which will run in one direction or the other depending upon which contact ring is engaged by the wiper. The motor drives a shaft 22 which is geared to the contact disc 19 as shown in Figure 4 so that the disc will be caused to follow up motion of the wiper 18. In this construction the motor forms a drive means capable of supplying substantial power without loading the wiper 18 and the scale beam. Thus the motor will accurately follow up motions of the beam 10 without interfering with sensitivity of the beam to provide a substantial amount of power for operating the scale indicating mechanism.

Figure 3:
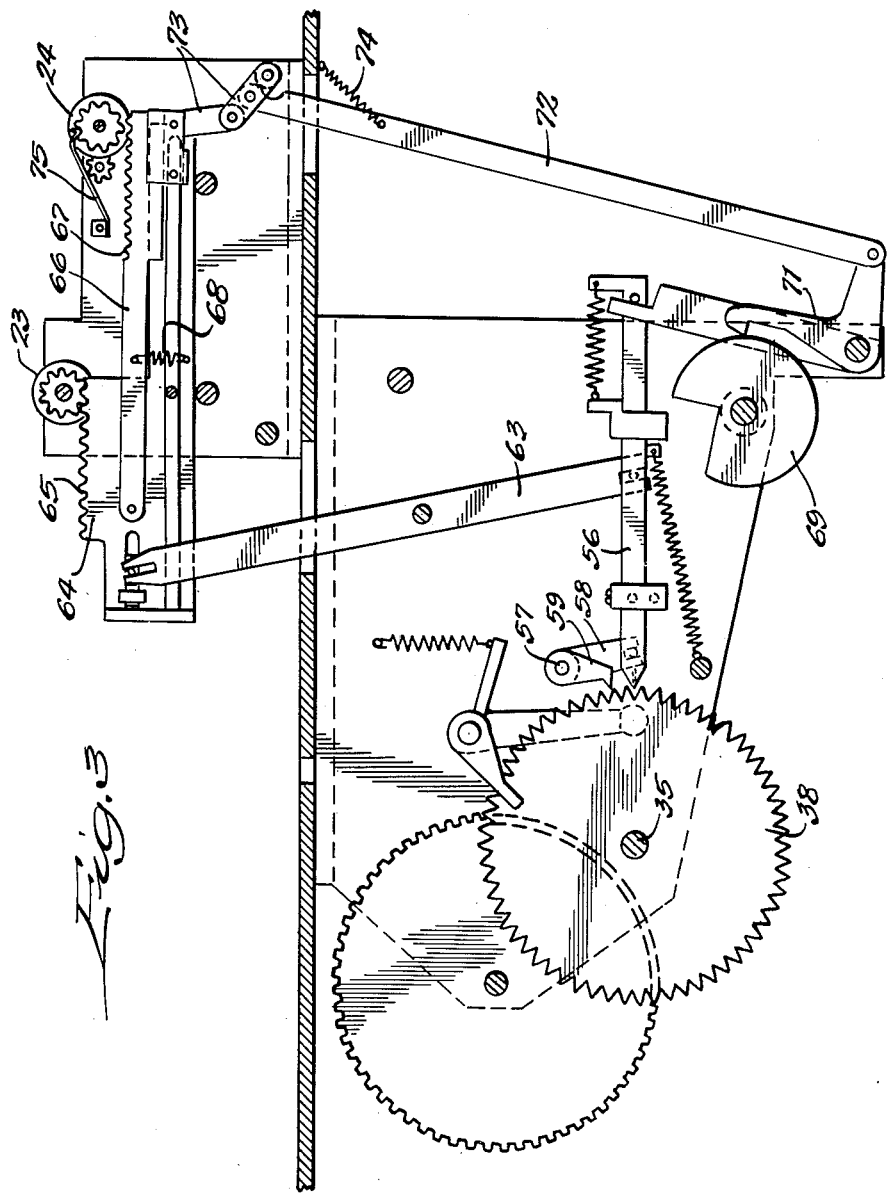
Figure 3 is a side view with parts in section illustrating the indicating mechanism.

Indications of the load on the scale may be obtained in any desired manner but are preferably obtained on indicating counters which may contain printing wheels to provide a printed record of the weights. Two such counters 23 and 24 are provided, as shown in Figures 3 and 4, the counters being of the usual rotating disc type, each comprising a plurality of counter wheels numbered on their peripheries. In the preferred construction the numbers are of the raised printing type and may cooperate with a card holding mechanism and a printing mechanism to produce a printed record on a card. Since this mechanism per se forms no part of the invention, a detailed showing thereof has been omitted.

The counters are adapted to be controlled by a step cam mechanism shown in Figure 4 as comprising a set of unit cams 25 and a set of tens cams 26 mounted on a shaft 27. The shaft 27 also carries a ratchet wheel 28 and a pinion 29 meshing with a gear 31 on a countershaft 32. The countershaft 32 carries a gear 33 meshing with a gear 34 on a second cam shaft 35 which carries a hundreds cam 36 and a thousands cam 37. While the units have been referred to as ones, tens, hundreds and thousands, it will be apparent that any desired unit could be used such as tons, or any desired multiple thereof. The unit cams 25 are so related to the tens cams 26 that each step on the cam 26 occupies the same radial distance as a set of ten steps on the cam 25. The gearing between the shafts 27 and 35 is such that the shaft 35 will turn in the proper ratio to the shaft 27 to produce a proper indication. The shaft 35 may also carry a ratchet wheel 38 similar to the ratchet wheel 28 on shaft 27. The shaft 27 is connected through gear 39 to a shaft 41 aligned with the shaft 22 and adapted to be connected thereto through a releasable clutch 42. While a face type positive clutch has been shown at 42, it will be apparent that any desired releasable clutch can be employed. The clutch is controlled through a cam 43 by a manually operable control camshaft 44 readily accessible from the front of the mechanism, as shown in Figure 1.

The step cams are adapted to be engaged respectively by feelers 45, 46, 47 and 48 which are urged toward the cams by springs 49. Each of the feelers carries at its end remote from the cams a pin 51 engageable by the upper end of a lever 52 whose position is controlled by a cam 53 on a shaft 54. While only one cam 53 has been shown in Figure 4, it will be apparent that there is a similar cam for each of the feelers so that when the shaft 54 is turned the feelers will all operate as described hereinafter. The shaft 54 also carries cams 55 controlling slidable ratchet pawls 56 which are engageable respectively with the ratchet wheels 28 and 38. The pawls 56 prevent accidental turning of the step cams when the feelers advance and also insure that the step cams are in proper position to have one of the steps thereon register with the corresponding feeler. Preferably a shaft 57 is pivoted above the pawls and has a crank arm 58 at one end thereof engaging a pin on the left hand pawl 56 to be turned as the pawl 56 moves. At its opposite end the shaft 57 carries a pawl 59 to engage the ratchet 38 to insure that both shafts 27 and 35 will be rocked simultaneously. The cam shaft 54 is periodically turned to effect movement of the feelers into engagement with the cams by means of a motor 61 connected to the shaft 54. The motor 61 is controlled by a manually operable switch 62 which is readily accessible from the front of the mechanism, as shown in Figure 1, and which is connected to the motor through a well known type of control circuit so that the motor will turn the shaft 54 through one complete revolution each time the switch 62 is closed. Since this type of control circuit is well known in the art, it is not illustrated in detail herein.

As the shaft 54 turns, the cams 53 will release the feelers 45 to 48 allowing them to move into engagement with the step cams 25, 26, 36 and 37, respectively. The mount each feeler will move depends upon the position of its corresponding step cam so that the feelers will move to positions which are dependent upon the adjustment of the step cams. The motor 61 will also be connected to the printing mechanism to cause it to operate when the feelers are in engagement with the cams to give a printed indication of the loads being weighed.

The indicators 23 and 24 are adapted to be turned by movement of the feelers and for this purpose each feeler has connected thereto one end of a lever 63 whose opposite end is connected to a slidable bar 64 formed on its upper surface with rack teeth 65. The rack teeth on the bars 64 mesh respectively with the several rotatable wheels of the indicator 23 so that as the feelers move the wheels of indicator 23 will be correspondingly moved to produce an indication of the weight set up in the step cams. It will be noted that the indicator 23 is permanently connected to the feelers so that this indicator will always be returned to zero when the feelers are returned to their initial position and will only be in weight indicating position when the feelers are advanced into engagement with the step cams.

In order to operate the indicator 24 to give an indication of the total accumulated weight of the several operations, a one way drive means is provided between the feelers and the wheels of the indicator 24 so that the indicator 24 is adjusted only when the feelers are moving in one direction. For this purpose a lever 66 is pivoted on each of the bars 64 and is formed with rack teeth 67 meshing with pinion teeth on the wheels of the indicator 24. The levers 66 are normally urged away from the wheels of indicator 24 by springs 68 and are adapted to be moved into engagement with the indicator 24 by a cam 69 on the shaft 54. As shown, the cam 69 engages one end of a bell crank lever 71 whose opposite end is connected by a link 72 to the central portion of the lowermost one of a pair of toggle links 73. One end of the linkage 73 is pivoted on a fixed pivot on a frame of the machine and the opposite end is connected to the free end of the lever 66. It will be understood that there is a toggle linkage 73 for each of the feelers and for each of the wheels of indicator 24 and that all of such linkages are connected to move together in response to the cam 69. With the cam 69 in its normal position, as shown in Figures 3 and 4, the bell crank 71 will be held clockwise to pull down on the levers 66 thereby to disengage the rack teeth 67 of such levers from the wheels of the counter 24. As the shaft 54 turns to a position in which it starts to retract the feelers from the step cams, the bell crank 71 will move into a cut out portion on the cam allowing the bell crank to rock counter clockwise under the influence of a spring 74 thereby to raise the levers 66 and to mesh the rack teeth thereon with the pinions on the counter 24. As shown in Figure 3, springs 75 may be provided engaging the pinions on the counter 24 to prevent accidental movement thereof. Preferably the cams 53 on the shaft 54 are so arranged that they will move the feelers successively away from the step cams, the lowest unit feeler moving first, and the counter 24 is so arranged that complete rotation of one of its wheels will cause the next higher wheel to advance one notch thereby adding a one to the next higher wheel before it starts to advance. In this way the indicator 24 can properly accumulate totals over a series of operations.

To reset the step cams after a weighing operation or a series of weighing operations, a resetting motor 76 is provided connected to the shaft 41 though a magnetic clutch 77. The motor 76 and the magnetic clutch 77 are controlled by a switch 78 which is accessible from the front of the mechanism, as shown in Figure 1. The switch 78 controls the motor 76 and the clutch 77 simultaneously so that when the motor is energized the clutch will be engaged. At this time the clutch 42 will be disengaged so that the motor 76 can drive the shaft 27 through the gear 39 to turn the step cams back to their zero position. Preferably, the circuit to the motor 76 and clutch 77 is through a limit switch, not shown, which will be opened when the step cams reach their zero position to interrupt the motor circut. The front panel of the mechanism adjacent the switches 62 and 78 may be provided with one or more signal lights 79 to indicate when either of the motors 61 or 76 is in operation.

In a typical operation of the weighing scale, as described, it may be desired to weigh and to indicate the net loads carried by each of a number of trains of cars and the accumulated total net load over a period of operation such as a day. The scale may conveniently be used in conjunction with a rotary dump which receives one or more cars from a train at one time and which is operable to dump the load from the cars. In an operation of this type assuming that the step cams are in their zero condition and the indicators 23 and 24 are both set at zero, the clutch camshaft 44 may be turned to the gross weight position in which the clutch 42 is disengaged. At this time the car or cars to be dumped are run into the rotary dump mechanism and the gross weight thereof will deflect the beam 10 and cause the motor 21 to turn to a position corresponding to the gross weight of the cars. The shaft 44 is then turned to its tare position in which the clutch 42 is engaged and the rotary dump mechanism is clamped to start a car dumping operation. Clamping of the dump mechanism removes all of the weight from the scale so that the beam 19 returns to its zero position and the motor 21 follows it. During this operation, since the clutch 42 is engaged the motor 21 will drive the shaft 27 and the step cams forward from the zero position to a position corresponding to the gross weight of the load. It will be noted that the cams and the drive gearing therefor are so arranged as to effect a reversal so that the cams will be driven forward while the motor 21 is turning backward. After the cars have been dumped and the dump mechanism has been released, the beam 10 will deflect to a position corresponding to a tare weight of the cars themselves and will cause the motor 21 to turn forward a proportional amount. Since the clutch 42 is still engaged, forward operation of the motor will drive the shaft 27 and the step cams backward an amount proportional to the tare weight, leaving the step cams in a position corresponding to the net weight. The handle 44 is then returned to its closed position to disengage the clutch 42 and the cars may be removed from the rotary dump preparatory to receiving the next car or group of cars thereon.

After each car or group of cars making up a complete train has been weighed in the manner described above, it will be observed that the step cams have been moved to a position corresponding to the total net weight of the entire train load. This is because of the fact that the clutch 42 is disengaged except when being moved to indicate gross weight and to subtract tare therefrom so that at the end of the unloading of a complete train the step cams will be in a position corresponding to the net weight of the entire train. At this time a record may be made of the net weight of the train by inserting a record card over the indicators 23 and 24 and energizing the motor 61. The feelers will move into the cams, the racks 65 will turn the wheels of the indicator 23 to a position corresponding to the setting of the step cams, and a card placed above the wheels will be printed with an indication of the weight of the entire train load. As the feelers are returned, the levers 63 will swing upward to mesh the racks 67 thereon with the wheels of the indicator 24, and this indicator will be turned to a corresponding position indicating the weight of the entire train load. The step cams may then be reset to zero position by the motor 76 and the operation as described may be repeated on a separate train load of material. At the end of weighing the second train load, the motor 61 may again be energized to produce an indication on the indicator 23 of the net weight of the second train load. It will be noted that when the indicator 23 shows the weight of the second train load the indicator 24 shows the weight of the first train load and as the feelers return to their normal position the indicator 24 will be reset to show the accumulated total weight of the first and second train loads.

This operation may be continued throughout any desired period such as a full day's operation, and at the end of the period the accumulated weight of material unloaded during the period may be indicated by the indicator 24. Thus in a very simple manner the sub-total weight of each train load of material may be separately accumulated in the step cams and shown by the indicator 23 while the accumulated total may be carried by the indicator 24.

Instead of indicating the weights of a series of train loads, as described, the mechanism may also be conveniently used to show the individual and total net loads of a series of single vehicles such as trucks. This operation is similar in that the individual net load of each truck may be shown by the indicator 23 without accumulating a sub-total in the step cams, and the accumulated total of a number of loads over a period of time may be shown by the indicator 24. This operation is identical with that described above except that a card would be printed after weighing each load and the step cams would be reset to zero after each load. Numerous other uses of the weighing mechanism in different types of operations will occur to those skilled in the art, and the operations described are intended as illustrative, typical operations only.

While one embodiment of the invention has been shown and described in detail herein, it will be understood that this is illustrative only and is not to be taken as a definition of the scope of the invention, reference being had for this purpose to the appended claims.

What is claimed is:

1. A recording device comprising drive means controlled to move in response to a value to be recorded, a movable cam, a clutch for connecting the drive means to the cam, manually operable means to control the clutch, a feeler engageable with the cam, indicating means operated by the feeler and manually controllable means to move the feeler toward the cam.

2. A recording device comprising, drive means controlled to move in response to a value to be recorded, a movable cam, a clutch for connecting the drive means to the cam, manually operable means to control the clutch, a feeler engageable with the cam, an indicating device, and one way drive means connecting the indicating device to the feeler to be operated when the feeler moves in one direction only.

3. A recording device comprising, drive means controlled to move in response to a value to be recorded, a movable cam, a clutch for connecting the drive means to the cam, manually operable means to control the clutch, a feeler engageable with the cam, an indicating device, a releasable driving connection between the indicating device and the feeler, and control means to control movement of the feeler toward and away from the cam and simultaneously to control the releasable connection so that the feeler operates the indicating device only during movement in one direction.

4. A recording device comprising, drive means controlled to move in response to a value to be recorded, a movable cam, a clutch for connecting the drive means to the cam, manually operable means to control the clutch, a feeler engageable with the cam, a pair of indicating devices, a permanent driving connection between one of the indicating devices and the feeler, and a one way driving connection between the other indicating device and the feeler.

5. A recording device comprising, drive means controlled to move in response to a value to be recorded, a movable cam, a clutch for connecting the drive means to the cam, manually operable means to control the clutch, a feeler engageable with the cam, control means to control movement of the feeler toward and away from the cam, a pair of indicating devices, a permanent driving connection between one of the indicating devices and the feeler, a releasable driving connection between the other indicating device and the feeler, and means operated by the control means to release the releasable connection when the feeler is moving in one direction.

6. A recording device comprising, drive means controlled to move in response to a value to be recorded, a series of step cams, means including a disengageable clutch to connect the drive means to the step cams, feelers moveable into engagement with the step cams, manually controllable means to control movement of the feelers, and indicating means operated by movement of the feelers.

7. A recording device comprising, drive means controlled to move in response to a value to be recorded, a series of step cams, means including a disengageable clutch to connect the drive means to the step cams, feelers movable into engagement with the step cams, rotatable cams to control movement of the feelers, indicating mechanism, means connecting the feelers to the indicating mechanism, a cam rotatable with the first named cams, and means operated by the last named cam to make the last named means inoperative.

8. A recording device comprising drive means controlled to move in response to a value to be recorded, a series of step cams, means including a disengageable clutch to connect the drive means to the step cams, feelers movable into engagement with the step cams, rotatable cams to control movement of the feelers, a pair of indicating devices, means permanently connecting one of the indicating devices to the feelers, releasable means connecting the other indicating device to the feelers, a cam rotatable with the first named cams, and means operated by the last named cam to control the releasable means.

9. A recording device comprising drive means controlled to move in response to a value to be recorded, a series of step cams, means including a disengageable clutch to connect the drive means to the step cams, feelers movable into engagement with the step cams, indicating means operated by movement of the feelers, a resetting drive means, and a releasable clutch to connect the resetting drive means to the step cams to return them to zero position.

10. A recording device comprising a series of step cams, feelers movable into engagement with the cams, linearly shiftable bars connected to the feelers to be moved thereby, racks pivotally connected to the bars, indicating means having pinions thereon to mesh with the racks, and means operated simultaneously with movement of the feelers to move the racks into and out of mesh with the pinions.

11. A recording device comprising a series of step cams, feelers movable into engagement with the cams, linearly shiftable bars connected to the feelers to be moved thereby, racks pivotally connected to the bars, indicating means having pinions thereon to mesh with the racks, rotatable drive means to move the feelers, a cam driven by the drive means, and a follower engaging the cam and connected to the racks to move the racks about their pivots on the bars so that the racks will mesh with the pinions during movement of the feelers in one direction only.

12. A recording device comprising a series of step cams, feelers movable into engagement with the cams, linearly shiftable bars connected to the feelers to be moved thereby, racks pivotally connected to the bars, indicating means having pinions thereon to mesh with the racks, a rotatable cam shaft having a series of cams thereon to operate the feelers, an additional cam on the shaft, and a follower engaging the cam and connected to the racks to move the racks about their pivots on the bars so that the racks will mesh with the pinions during movement of the feelers in one direction only.

VERNE C. KENNEDY.

REFERENCES CITED

The following references are of record in the file of this patent:

UNITED STATES PATENTS

| Number | Name | Date |
|---|---|---|
| 624,374 | Orr | May 2, 1899 |
| 1,584,508 | Boyer | May 11, 1926 |
| 1,757,072 | Boyer | May 6, 1930 |
| 2,040,073 | Brendel | May 12, 1936 |
| 2,111,127 | Rast | Mar. 15, 1938 |
| 2,173,575 | Binns | Sept. 9, 1939 |
| 2,302,458 | Miner | Nov. 17, 1942 |
| 2,528,883 | Hayward | Nov. 7, 1950 |